United States Patent [19]

Melocik et al.

[11] 4,364,022

[45] Dec. 14, 1982

[54] MAGNETIC CONTROL PEDAL APPARATUS

[75] Inventors: Grant C. Melocik, Chardon; Wayne T. Wiblin, Saybrook, both of Ohio

[73] Assignee: Towmotor Corporation, Mentor, Ohio

[21] Appl. No.: 309,342

[22] PCT Filed: Sep. 11, 1981

[86] PCT No.: PCT/US81/01233

§ 371 Date: Sep. 11, 1981

§ 102(e) Date: Sep. 11, 1981

[51] Int. Cl.³ .............................................. H01L 43/04
[52] U.S. Cl. .................................................. 338/32 H
[58] Field of Search ......................... 338/32 H, 32 C; 324/251; 323/368; 180/314, 315; 307/278, 309; 74/478, 512, 513, 560, 561

[56] References Cited

U.S. PATENT DOCUMENTS

| 3,124,693 | 3/1964 | Peras | 290/7 |
| 3,818,292 | 6/1974 | Berman | 318/139 |
| 4,267,544 | 5/1981 | Wiblin | 338/32 H |

Primary Examiner—C. L. Albritton
Attorney, Agent, or Firm—Phillips, Moore, Weissenberger, Lempio & Majestic

[57] ABSTRACT

A control pedal apparatus (10) including a frame member (12), a Hall effect device (52) for generating a control signal responsive to an applied magnetic field, a pedal (14) having a magnet (16) and movable between first and second positions at which a magnetic pathway is opened and closed, respectively, and a movable pedal support (18) for conducting the field between the magnet (16) and the device (52) when the pedal (14) is at the second position.

Prior pedal apparatus have wires, connected between the device and an electrical control circuit, to control vehicle direction and which can fail due to flexing, together with a linkage connected to an accelerator portion to control vehicle speed. The pedal support of this invention conducts the magnetic field to a fixed Hall effect device, whereby the wires are eliminated, and the pedal support is movable to generate pulses to control vehicle speed whereby the linkage is eliminated.

9 Claims, 1 Drawing Figure

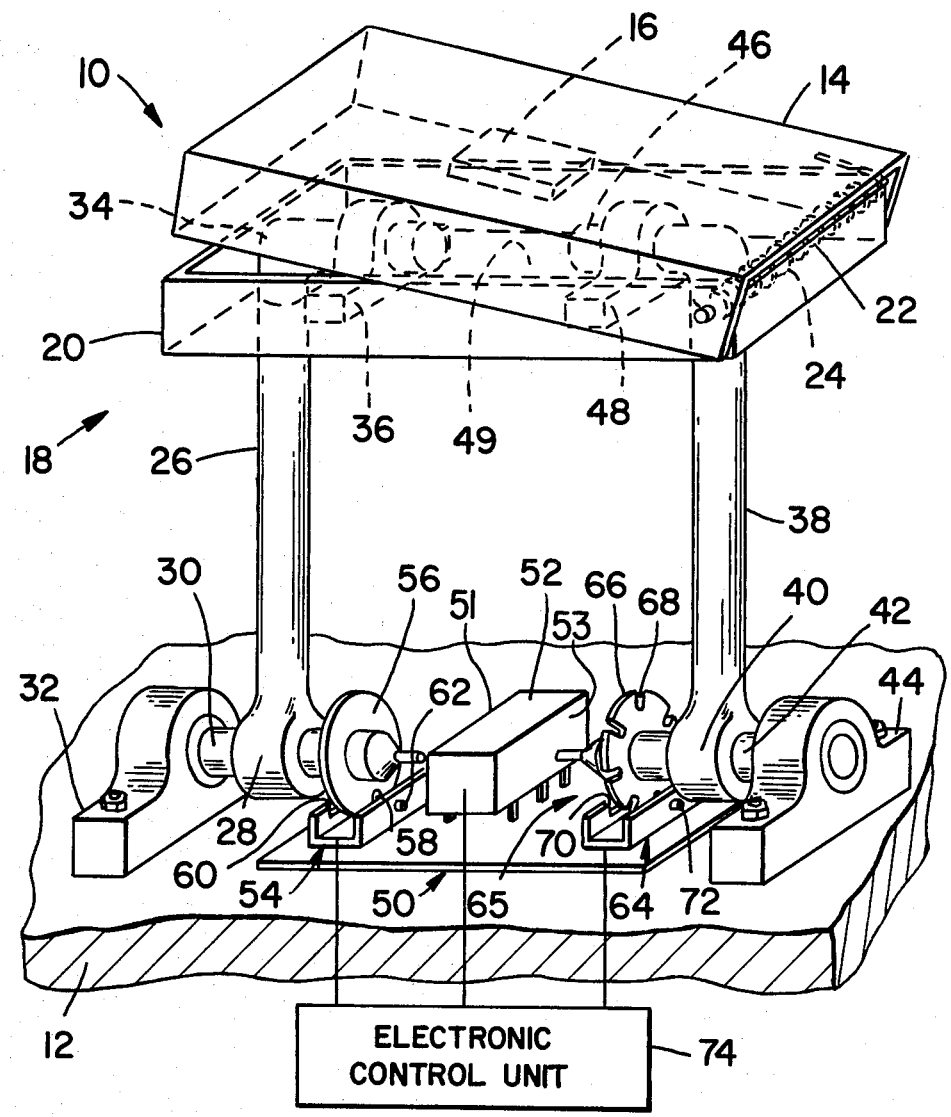

MAGNETIC CONTROL PEDAL APPARATUS

DESCRIPTION

Technical Field

This invention relates generally to vehicle directional and speed control apparatus and, more particularly, to magnetic control pedal apparatus for controlling the direction and speed of the vehicle.

Background Art

Many control pedal assemblies or apparatus have been designed or developed for controlling the direction and speed of a vehicle. For example, at least one control pedal assembly has pedal portions for controlling the direction of the vehicle, i.e., forward or reverse, and a pedal portion for controlling vehicle speed. A magnet is connected, for example, to the pedal portion for placing the vehicle in forward drive and at least one Hall effect device is connected to the accelerator pedal portion. The directional pedal portion can be moved to a position in which the magnet is in proximity to the Hall effect device so that the latter then generates a control signal to place the vehicle in forward drive. Also, the accelerator pedal portion can be depressed with this directional pedal portion to accelerate the vehicle forwardly.

One problem with the prior control pedal assemblies is that electrical wires are connected from the Hall effect device to a control circuit fixedly connected elsewhere on the vehicle. As the accelerator pedal portion is depressed or released the wires will flex at or near the pivotal point of the pedal portion. This flexing eventually can cause failure of the wires and, consequently, increase maintainance costs for repair or replacement.

Furthermore, the accelerator pedal portion is connected to a mechanical control linkage which moves in response to the depression of the accelerator pedal portion to change the vehicle speed. This mechanical linkage adds to the complexity, weight and cost of the overall directional and speed control apparatus.

The present invention is directed to overcoming one or more of the problems as set forth above.

DISCLOSURE OF THE INVENTION

In one aspect of the present invention, a control pedal apparatus is provided having a frame member, magnetic means for generating a control signal in response to an applied magnetic field and being connected to the frame member, and a pedal having a magnet and being movable between a first position at which a magnetic pathway is opened and a second position at which the magnetic pathway is closed, the improvement comprising a pedal support of magnetically permeable material and being constructed to conduct the magnetic field between the magnet and the magnetic means in response to the pedal being at the second position.

Prior control pedal apparatus have wires, connected between the Hall device and an electrical control circuit, which can fail due to flexing, and a complex mechanical linkage that is connected to an accelerator pedal portion to control vehicle speed. With the present invention, the magnetic means is fixed to the frame member and the movable pedal support conducts the applied magnetic field to the magnetic means, whereby control wires are not flexed in operating the pedal apparatus. Also, the pedal support is movable to control vehicle speed without requiring any mechanical control linkage.

BRIEF DESCRIPTION OF THE DRAWING

The single FIGURE is a view in perspective of an embodiment of the present invention.

BEST MODE FOR CARRYING OUT THE INVENTION

The single FIGURE shows a control pedal apparatus 10 for controlling the direction and speed of, for example, a vehicle having a frame member 12. A pedal 14 carries a magnet 16 and is pivotally supported on a movable pedal support shown generally at 18. Pedal support 18 has a base 20 to which the pedal 14 is mounted pivotally by a pivot pin 22. A spring 24, for example a torsion spring, biases the pedal 14 into the upper position shown. Pedal 14 is movable between the upper position, which corresponds to a reverse drive position, and a lower position which corresponds to a forward drive position.

Pedal support 18 also includes an inverted L-shaped elongated member or rod 26 having a lower end 28 which is rotatably connected to the frame member 12 by a rotatable shaft 30 and bracket 32. An upper end 34 of the rod 26 supports the base 20 through a bracket 36. Another inverted L-shaped elongated member or rod 38 has a lower end 40 rotatably connected to the frame member 12 by a rotatable shaft 42 and a bracket 44. Rod 38 has an upper end 46 which also supports the base 20 through a bracket 48. The upper end 34 and upper end 46 are spaced apart to provide a space 49 which receives the magnet 16 when the pedal 14 is depressed to the forward drive position. Rod 26, rod 38, shaft 30 and shaft 42 are made of magnetic permeable material.

A printed circuit board 50 is fixed to the frame member 12. A magnetic means 52, such as a Hall effect device, having first 51 and second 53 sides, is a component of the printed circuit board 50 and responds to an applied magnetic field to generate a control signal. An opto-interrupter 54 is mounted on the printed circuit board 50 to provide "positive-neutral" control. Opto-interrupter includes a disc 56, having a slot 58, which is fixed to the rotatable shaft 30. A light source 60, such as a light emitting diode, and a light detector 62 are positioned on opposite sides of the disc 58. The disc 58 interrupts the light from the light source 60 to the light detector 62, except when the slot 58 is in one position to transmit the light. In this one position, which corresponds to neutral, the light detector 62 will generate a control signal so that the vehicle can be started only in neutral. When the disc 56 interrupts the light, no such control signal is generated and the vehicle cannot be started.

A shaft encoder 64 is mounted on the printed circuit board 50 for controlling the speed of the vehicle. Shaft encoder 64 includes, for example, an opto-interrupter 65 having a disc 66 with a plurality of slots 68 that is connected to the rotatable shaft 42. A light source 70, such as a light emitting diode, and a light detector 72 are on opposite sides of the disc 66. As the shaft 42 rotates, disc 66 also will rotate to move a number of slots 68 in the light path between light source 70 and light detector 72. When the shaft 42 is rotated, pulses of light will be detected by the light detector 72 as the slots 68 cross the light path between the light source 70 and the detector 72.

An electronic control unit 74 responds to the pulses generated by opto-interrupter 54 and opto-interrupter 64. If the control pedal apparatus 10 is in the neutral position shown, electronic control unit 74 will respond to data from opto-interrupter 54 to control start-up of the vehicle. Thereafter, as control pedal apparatus 10 is rotated in a clockwise direction, as viewed from the right, opto-interrupter 65 will generate pulses that are counted by electronic control unit 74, which count corresponds to the position of shaft 42. The electronic control unit 74 can then control acceleration of the vehicle to a speed called for by the position of control pedal apparatus 10. Thereafter, as the control pedal apparatus 10 is rotated counter-clockwise towards the neutral position shown, opto-interrupter 65 again will generate pulses, but these will be subtracted from the count in control unit 74. Consequently, control unit 74 now will control deceleration of the vehicle to reduce the vehicle speed to a value corresponding to the new position of control pedal apparatus 10.

INDUSTRIAL APPLICABILITY

The control pedal apparatus 10 can be connected to a suitable electronic control unit 74 and used on, for example, an electric drive fork lift truck to control vehicle speed and direction. In the position shown in the FIGURE, control pedal apparatus 10, particularly pedal 14, is biased upwardly into a forward drive position. Control pedal apparatus 10 also is in a positive-neutral position so that electronic control unit 74 will respond to data from opto-interrupter 54 to enable the operator to start the truck.

Thereafter, to accelerate the truck forwardly, the control pedal apparatus 10 will be rotated in a clockwise direction from the neutral position. Control unit 74 will respond to the pulses generated by opto-interrupter 64 as shaft 42 is rotated to increase the speed of the truck. To decelerate the truck while moving forwardly, the control pedal apparatus 10 will be rotated counter-clockwise towards the neutral position. As shaft 42 is rotated counterclockwise, control unit 74 will respond to the pulses generated by opto-interrupter 64 to reduce the speed of the truck.

To accelerate the truck in reverse drive, the pedal 14 of control pedal apparatus 10 will be depressed to position magnet 16 between arm 34 and arm 46. Hall effect device 52 now will respond to the applied magnetic field by generating a control signal which will be detected by electronic control unit 74 to place the truck in reverse drive. Thereafter, with the pedal 14 depressed, the control pedal apparatus 10 can be rotated clockwise or counterclockwise to increase or decrease the vehicle speed in the reverse direction.

In summary, control pedal apparatus 10 has no wires that must be flexed when moving the pedal 14 and/or the movable pedal support 18 to control vehicle direction and speed. Control pedal apparatus 10 also does not require any mechanical linkage for responding to movement of pedal support 18 to control vehicle speed.

Other aspects, objects and advantages of this invention can be obtained from a study of the drawings, the disclosure and the appended claims.

We claim:

1. In a control pedal apparatus (10) having a frame member (12), magnetic means (52) for generating a control signal in response to an applied magnetic field and being connected to said frame member (12), and a pedal (14) having a magnet (16) and being movable between a first position at which a magnetic pathway is opened and a second position at which said magnetic pathway is closed, the improvement comprising:
   a movable pedal support (18) of magnetically permeable material mounted to said frame member (12) and movable between a plurality of positions, said movable pedal support being constructed to conduct the magnetic field between said magnet (16) and said magnetic means (52) in response to said pedal (14) being at said second position; and
   means (64) for generating data corresponding to said plurality of positions of said movable pedal support (18).

2. In a control pedal apparatus (10) having a frame member (12), magnetic means (52) for generating a control signal in response to an applied magnetic field, said magnetic means (52) having a first (51) and second (53) side and being connected to said frame member (12), and a pedal (14) having a magnet (16) and being movable between a first position at which a magnetic pathway is opened and a second position at which said magnetic pathway is closed, the improvement comprising:
   a movable pedal support (18) having a first elongated member (26), a second elongated member (38) and a base member (20);
   said first elongated member (26) being constructed of magnetically permeable material and having a lower end (28) and an upper end (34), said lower end (28) being rotatably connected to said frame member (12) adjacent said first side (51) of the magnetic means (52);
   said second elongated member (38) being constructed of magnetically permeable material and having a lower end (40) and an upper end (46), said lower end (40) being rotatably connected to said frame member (12) adjacent said second side (53) of the magnetic means (52) and said upper end (46) being spaced-apart from the upper end (34) of said first elongated member (26) and defining a space (49) therebetween;
   said base member (20) being connected to the second end (34,46) of said first and second elongated members (26,38); and
   said pedal (14) being pivotally mounted on said base member (20) and movable from said first position to said second position at which said magnet (16) is positioned in said space (49) and said magnetic field is passed between said magnet (16) and said magnetic means (52) by said first and second elongated members (26,38).

3. The control pedal apparatus (10) according to claim 2 wherein said magnetic means (52) is a Hall effect device.

4. Apparatus (10) for controlling the direction and speed of a vehicle, comprising:
   (a) a frame member (12);
   (b) magnetic means (52) for generating a directional control signal in response to an applied magnetic field and being connected to said frame member (12);
   (c) a movable pedal support (18) of magnetically permeable material connected to said frame member (12) adjacent said magnetic means (52) and being movable between a plurality of positions corresponding to the speed of the vehicle;
   (d) a movable pedal (14) having a magnet (16) and being pivotally connected to said movable pedal support (18), said movable pedal (14) being movable between a first position at which a magnetic pathway is opened and a second position at which said magnetic pathway is closed between said magnet means (52) and said magnet (16) through said movable pedal support (18), said first position corresponding to one vehicle direction and said second position corresponding to another vehicle direction; and (e) means (64) for generating data corresponding to said plurality of positions of said movable pedal support (18).

5. Apparatus (10) according to claim 4 wherein said magnetic means (52) has one side and another side and wherein said movable pedal support (14) includes:

(a) a first member (26) having one end (28) rotatably mounted to said frame member (12) at said one side of said magnetic means (52) and having another end (34); and (b) a second member (38) having one end (40) rotatably mounted to said frame member (12) at said other side of said magnetic means (52) and having another end (46) spaced apart (49) from said other end (34) of said first member (26), said magnet (16) being movable into and out of the space (49) between said other end (34, 46) of said first member (26) and said second member (38).

6. Apparatus (10) according to claim 4 wherein said means (64) for generating includes an opto-interrupter (65).

7. Apparatus (10) for controlling the direction and speed of a vehicle comprising:

(a) a frame member (12);

(b) a Hall effect device (52) having one side and another side and being fixed to said frame member (12);

(c) a movable pedal support (18) including (i) a first elongated member (26) of magnetically permeable material having one end (28) rotatably mounted to said frame member (12) at said one side of said Hall effect device (52) and having another end (34), (ii) a second elongated member (38) of magnetically permeable material having one end (40) rotatably mounted to said frame member (12) at said other side of said Hall effect device (52) and having another end (46) spaced apart (49) from said other end (34) of said first elongated member (26), said first elongated member (26) and said second elongated member (38) being rotatable between a plurality of positions corresponding to vehicle speed, and (iii) a base member (20) fixed to said other end (34, 46) of said first elongated member (26) and said second elongated member (38);

(d) a movable pedal (14) having a magnet (16) and being pivotally mounted on said base member (20), said movable pedal (14) being pivotable between a first position at which a magnetic pathway is opened and a second position at which said magnetic pathway is closed from said magnet (16) through said first elongated member (26), said Hall effect device (52), said second elongated member (38) and back to said magnet (16); and (e) means (64) for generating data corresponding to said plurality of positions of said first elongated member (26) and said second elongated member (38).

8. Apparatus (10) according to claim 7 wherein said means (64) for generating includes an opto-interrupter (65).

9. Apparatus (10) according to claim 7 further including means (54) for generating data corresponding to a positive-neutral position of said movable pedal support (18).

* * * * *